(12) United States Patent
Wang (10) Patent No.: US 12,458,167 B2
(45) Date of Patent: Nov. 4, 2025

(54) NON-STICK VESSEL AND NON-STICK COOKING UTENSIL

(71) Applicant: ZHEJIANG BAHE KITCHENWARE CO., LTD., Wuyi (CN)

(72) Inventor: Ke Wang, Wuyi (CN)

(73) Assignee: Zhejiang Bahe Kitchenware Co., Ltd., Wuyi (CN)

( * ) Notice: Subject to any disclaimer, the term of this patent is extended or adjusted under 35 U.S.C. 154(b) by 95 days.

(21) Appl. No.: 18/454,656

(22) Filed: Aug. 23, 2023

(65) Prior Publication Data

US 2024/0374078 A1 Nov. 14, 2024

(30) Foreign Application Priority Data

May 11, 2023 (CN) .............................. 202310529969
Jul. 13, 2023 (CN) .............................. 202310855118

(51) Int. Cl.
A47J 36/02 (2006.01)

(52) U.S. Cl.
CPC .................................. A47J 36/025 (2013.01)

(58) Field of Classification Search
CPC ..... A47J 36/025; A47J 36/02; C23C 14/0641; C23C 14/081; C23C 14/14
See application file for complete search history.

(56) References Cited

U.S. PATENT DOCUMENTS

| | | | |
|---|---|---|---|
| 6,197,438 B1* | 3/2001 | Faulkner | C23C 14/0611 428/908.8 |
| 6,360,423 B1* | 3/2002 | Groll | C23C 4/02 220/573.1 |
| 8,021,768 B2* | 9/2011 | Ge | C23C 28/42 428/472 |
| 10,233,334 B2* | 3/2019 | Aizenberg | F28F 13/185 |
| 2003/0022027 A1* | 1/2003 | Groll | A47J 36/025 428/698 |
| 2008/0105689 A1* | 5/2008 | Ren | A47J 27/002 220/573.2 |
| 2010/0255340 A1* | 10/2010 | Ge | C23C 14/0036 204/192.15 |
| 2014/0154476 A1* | 6/2014 | Perillon | A47J 36/025 427/256 |
| 2014/0314991 A1* | 10/2014 | Smith | F01D 5/28 220/573.1 |
| 2015/0297025 A1* | 10/2015 | Pierson | C23C 16/50 204/192.15 |
| 2018/0171481 A1* | 6/2018 | Polesel Maris | A47J 36/025 |

(Continued)

FOREIGN PATENT DOCUMENTS

CN 107495826 * 12/2017
CN 111387795 * 7/2020

*Primary Examiner* — Don M Anderson (57) ABSTRACT

A non-stick metal vessel and a non-stick cooking utensil. The non-stick metal vessel includes a body. An inner surface of the body is constructed to exhibit a micro-level roughened texture. The micro-level roughened texture is coated with a PVD multi-metal film. The PVD multi-metal film is configured to be capable of creating a low surface energy micro-nano porous oil-locking structure. This disclosure possesses commendable advantages in terms of health and environmental friendliness. Furthermore, it offers remarkable anti-adhesive properties, exceptional hardness, outstanding wear resistance, and an extended lifespan.

9 Claims, 6 Drawing Sheets

(56) References Cited

U.S. PATENT DOCUMENTS

| | | | |
|---|---|---|---|
| 2019/0038070 A1* | 2/2019 | Cao ........................ | A47J 36/025 |
| 2023/0263335 A1* | 8/2023 | Cheng ..................... | A47J 37/10 |
| | | | 220/573.2 |
| 2024/0298835 A1* | 9/2024 | Wang ....................... | A47J 36/00 |
| 2024/0298842 A1* | 9/2024 | Zhang ................... | A47J 36/025 |

* cited by examiner

NON-STICK VESSEL AND NON-STICK COOKING UTENSIL

CROSS-REFERENCE TO RELATED DISCLOSURES

This disclosure claims priority to Chinese Patent Application No. 202310529969.7 with a filing date of May 11, 2023, and Chinese Patent Application No. 202310855118.1 with a filing date of Jul. 13, 2023. The content of the aforementioned applications, including any intervening amendments thereto, is incorporated herein by reference.

FIELD OF THE DISCLOSURE

The present disclosure relates to the field of culinary utensils, specifically to a non-stick vessel and a non-stick cooking utensil. The non-stick vessel and the non-stick cooking utensil as disclosed significantly enhances the non-stick property of metal vessels.

BACKGROUND OF THE DISCLOSURE

Conventional non-stick cooking utensils, e.g., non-stick pans, in the prior art typically involve coating the inner surface of the cooking utensils with a non-stick coating, commonly known as Teflon, scientifically referred to as polytetrafluoroethylene (PTFE). This coating has effectively addressed the issue of food sticking to the cooking utensils, bringing convenience to people's lives. However, during usage, especially in high-temperature stir-frying, the non-stick coating is prone to peeling off. Additionally, if the non-stick utensil is overheated, it can lead to the release of toxic gases and substances as PTFE undergoes carbonization and decomposition, contaminating the food and causing problems such as food sticking to the utensil and the potential ingestion of chemical coatings.

Based on this, the prior art has introduced a non-stick pan that utilizes the lotus leaf effect to create a non-stick structure on the inner surface of the utensil. This non-stick structure consists of periodic protrusions and/or recesses distributed on the inner surface, with dimensions ranging from a few micrometers to tens of micrometers. The inner surface of the non-stick pan transforms into a rough surface with a micro-scale roughness, and the contact area between the cooked food and the inner surface of the pan becomes a composite contact surface. The recessed areas between the protrusions and the recessed areas of the recesses contain trapped gas, forming an air cushion layer. This effectively reduces the contact area between the cooked food and the inner surface of the non-stick pan, preventing sticking and achieving physical non-stick properties without the need for a coating. Even during high-temperature stir-frying or when the pan is left empty on the stove, the coating-free non-stick pan does not release any toxic substances or gases, thereby ensuring that the cooked food and the kitchen environment remain uncontaminated and safer for cooking.

However, solely relying on this structure applied to the surface of the non-stick pan to form a physical non-stick layer is insufficient. This is because the non-stick pan needs heating during use, and the air cushion layer formed within the recessed areas mentioned above can be disrupted in a heated environment, rendering the physical non-stick performance ineffective.

Furthermore, if this physical non-stick method is only applied to the surface of the pan, it is inadequate to achieve long-lasting non-stick properties. Each time cooking is performed, the spatula repeatedly rubs against the surface of the utensil, resulting in the gradual wearing down of the physical non-stick layer over time, thereby failing to achieve long-term non-stick performanceiveness. This issue also requires urgent resolution.

SUMMARY OF THE DISCLOSURE

The present disclosure aims to address the aforementioned issues, and provides a non-stick metal vessel and a non-stick cooking utensil that exhibit high wear resistance and achieve long-lasting non-stick properties. This is achieved through the utilization of a PVD multi-metal film, which incorporates a micro-nano structure with low surface energy, composed of multiple metals, on a micro-textured surface. This remarkable innovation significantly enhances the non-stick performance.

In order to achieve the above objects, the present disclosure provides a non-stick metal vessel. The non-stick metal vessel includes a body. An inner surface of the body is constructed to exhibit a micro-level roughened texture. The micro-level roughened texture is coated with a PVD multi-metal film. The PVD multi-metal film is configured to be capable of forming a micro-nano porous oil-locking structure with low surface energy on the micro-level roughened texture. The micro-textured surface is formed through a sandblasting process, preferably using a multi-stage sandblasting technique. Alternatively, other methods can be employed to create the micro-textured surface. The roughness of the micro-textured surface achieved through sandblasting typically ranges from Rz25 to 100 μm. Rz roughness refers to the average sum of the heights of the five highest peaks and the depths of the five deepest valleys within a sampling length L, representing the micro-roughness of the surface.

The above may be further improved by the following embodiments.

In one embodiment, the thickness (h) of the PVD multi-metal film is smaller than the roughness (Rz) of the micro-textured surface. The thickness range of the PVD multi-metal film is 0.7 to 4.0 m. The body of the vessel includes a first metal layer, a heat distribution layer, and a second metal layer, arranged sequentially from the innermost to the outermost region. The first metal layer and second metal layer are bonded together through the heat distribution layer to ensure uniform heating of the first metal layer. The first metal layer is made of stainless steel, the heat distribution layer is made of aluminum, and the second metal layer is also made of stainless steel.

In some embodiments, the PVD multi-metal film includes a bottom layer, a middle layer, and a top layer which are sequentially deposited. The bottom layer includes metal titanium and/or metal chromium. The middle layer includes chromium nitride and aluminum nitride. Content of the chromium nitride is ranged from 60 wt % to 80 wt % and content of the aluminum nitride is ranged from 20 wt % to 40 wt %. Optionally, the middle layer includes chromium carbide. Content of the chromium carbide is ranged from 85 wt % to 95 wt %. The top layer includes metal copper and aluminum oxide; content of the copper is ranged from 1.0 wt % to 10 wt %. The top layer further includes iron oxide, with an iron oxide content ranging from 3 to 15 wt %. The thickness of the bottom layer ranges from 0.1 to 1.0 μm, the thickness of the middle layer ranges from 0.5 to 3.8 μm, and the thickness of the top layer ranges from 0.1 to 1.0 μm. The hardness of the PVD multi-metal film falls within the range of HV1100 to 3500. The thickness range of the PVD multi-metal film is 0.7 to 4.0 µm. The surface energy of the PVD multi-metal film is less than 40 dynes/cm$^2$, and the contact angle of water droplets on the film surface exceeds 95°.

Specifically, the PVD multi-metal film, when subjected to 5000 cycles of flat abrasion testing according to the Chinese National Standard GB/T32095.2-2015, achieves an evaluation rating of Grade I in terms of its non-stick performance during egg frying tests.

The present disclosure further provides a non-stick cooking utensil designed according to the aforementioned non-stick metal vessel.

The present disclosure has the following advantages.

The non-stick metal vessel and cooking utensil of the present disclosure exhibit excellent non-stick properties. The deposition of a low surface energy PVD multi-metal film on the micro-textured surface of the inner metal layer enables the formation of a micro-nano porous oil-locking structure, resulting in superior non-stick performance. Furthermore, the controlled thickness of the PVD multi-metal film significantly enhances its adhesion to the underlying layer, thereby increasing the lifespan of the non-stick metal vessel. Additionally, to address the technical problem of localized overheating and potential damage to the metal film during cooking, the present disclosure incorporates an aluminum heat distribution layer between the two metal layers. The aluminum heat distribution layer promotes more uniform heating of the bottom of the utensil, thereby extending the non-stick lifespan of the utensil.

The PVD multi-metal film in the present disclosure includes a low surface energy micro-nano porous structure composed of nitrides, carbides, and oxides of multiple metals (such as chromium, aluminum, titanium, copper, iron, etc.). The bottom layer primarily includes metal titanium and/or metal chromium, enhancing the adhesion of the PVD multi-metal film to the main body and improving the film's durability. The top layer includes metal copper and aluminum oxide, forming a protective oxide layer on the surface of the PVD multi-metal film to prevent oxidation and discoloration during usage. Additionally, the presence of copper provides effective antibacterial properties, particularly against *Escherichia coli* and *Staphylococcus aureus*, with an antibacterial effectiveness of over 99.99%. Moreover, even at copper content below 10 wt %, it still exhibits good non-stick performance. The surface energy of the PVD multi-metal film in the present disclosure can be reduced to below 40 dynes/cm$^2$, and the water droplet contact angle can exceed 95 degrees. The micro-nano porous oil-locking structure contributes to outstanding wear resistance and non-stick properties. Even after undergoing 5000 cycles of flat abrasion testing according to the Chinese National Standard GB/T32095.2-2015, the non-stick level of the film still reaches Grade I non-stick performance.

BRIEF DESCRIPTION OF THE DRAWINGS

In order to provide a clearer understanding of the technical solutions of the embodiments of the present disclosure, the accompanying drawings will be briefly described. It should be understood that the following description of the drawings is merely exemplary and does not limit the scope of the present disclosure.

Character Reference:

100, non-stick cooking utensil (non-stick metal vessel); 101, first metal layer; 102, second metal layer; 103, heat distribution layer; 104, PVD multi-metal film.

DETAILED DESCRIPTION OF THE DISCLOSURE

It is to be understood that similar labels and letters in the subsequent figures represent corresponding elements. Therefore, once an item is defined in one figure, there is no need to provide further definitions or explanations in the subsequent figures.

Unless otherwise defined, the technical and scientific terms used in this patent document should be understood in their ordinary sense by a person skilled in the field of the disclosure. The terms "first," "second," and similar words used in the patent specification and claims do not imply any particular order, quantity, or importance but are merely used to distinguish different components. Similarly, words such as "one," "a," or "the" do not imply any numerical limitation but indicate the presence of at least one. Terms such as "including" or "comprising" are intended to encompass the elements or objects listed following them, along with their equivalents, and do not exclude other elements or objects. Terms such as "center," "top," "bottom," "left," "right," "vertical," "horizontal," "inner," "outer," "far," "near," and the like are used to express relative positional relationships. When the absolute position of the described object changes, the relative positional relationship may correspondingly change. These terms are used for the convenience of describing the disclosure and simplifying the description, and should not be construed as limiting the disclosure.

In the description of the present disclosure, it should be noted that unless otherwise explicitly stated or specified, the terms "mounted," "connected," "linked," should be understood in a broad sense. For example, they can refer to fixed connections, separable connections, or integral connections; mechanical connections, electrical connections; direct connections or indirect connections through an intermediate medium; and internal communication between two components. Those skilled in the art can understand the specific meanings of these terms in the context of the present disclosure depending on the specific circumstances.

Certainly. The following detailed description of certain embodiments of the present disclosure will be provided in conjunction with the accompanying drawings. Unless conflicting, the features described in the following embodiments can be combined with each other.

Embodiment One

Figure 1:
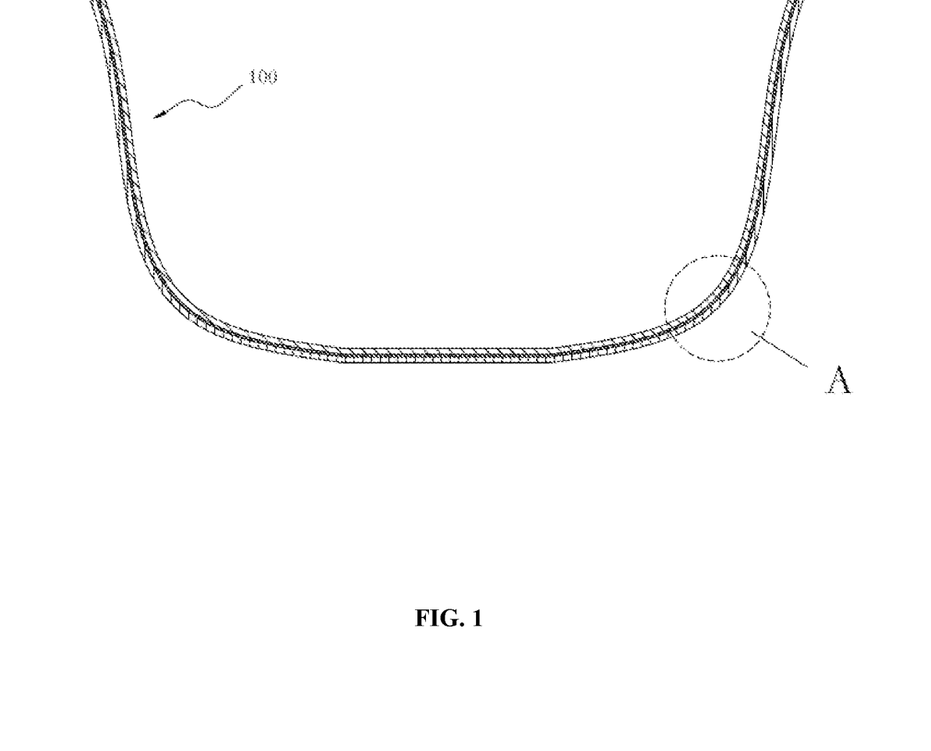
FIG. 1 is a cross-sectional view of a non-stick metal vessel according to one embodiment of the present disclosure.
Figure 2:
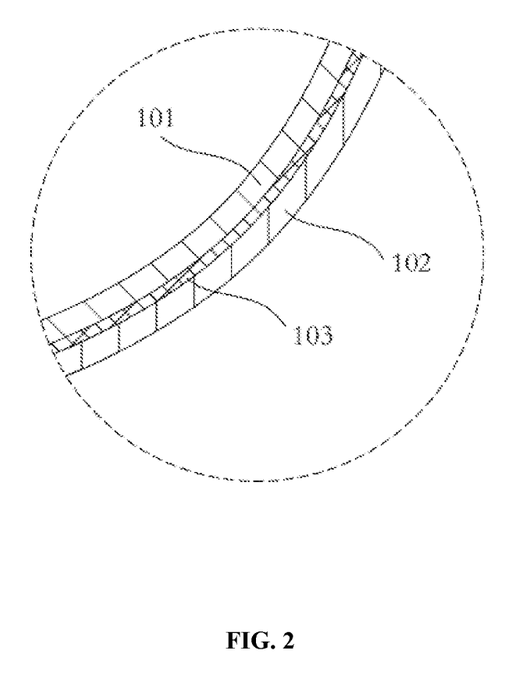
FIG. 2 is an enlarged view of A in FIG. 1.
Figure 3:
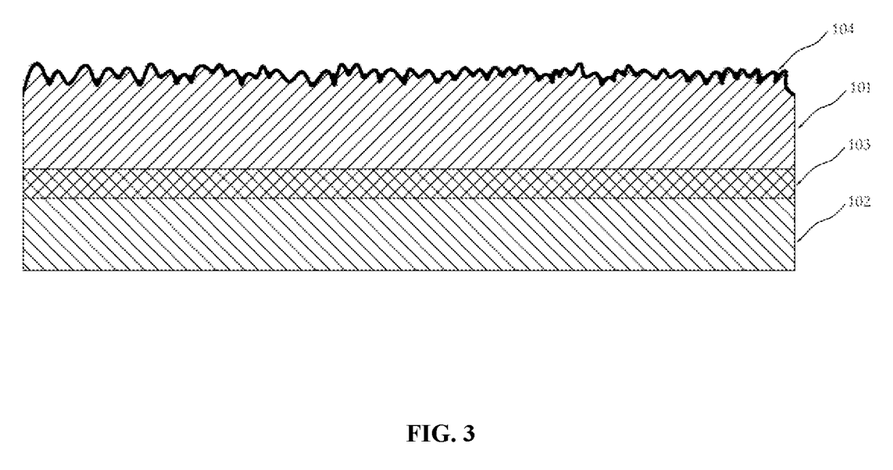
FIG. 3 is a schematic diagram of the non-stick structure in the non-stick metal vessel according to one embodiment of the present disclosure.
Figure 4:
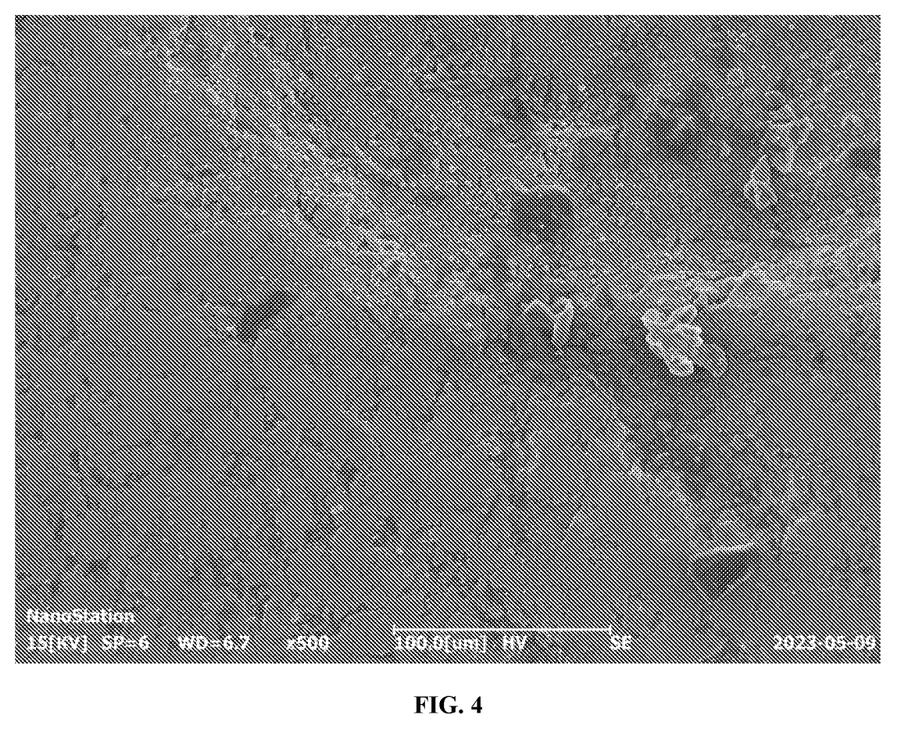
FIG. 4 is a surface morphology image of the non-stick metal vessel (500× magnification) according to one embodiment of the present disclosure.
Figure 5:
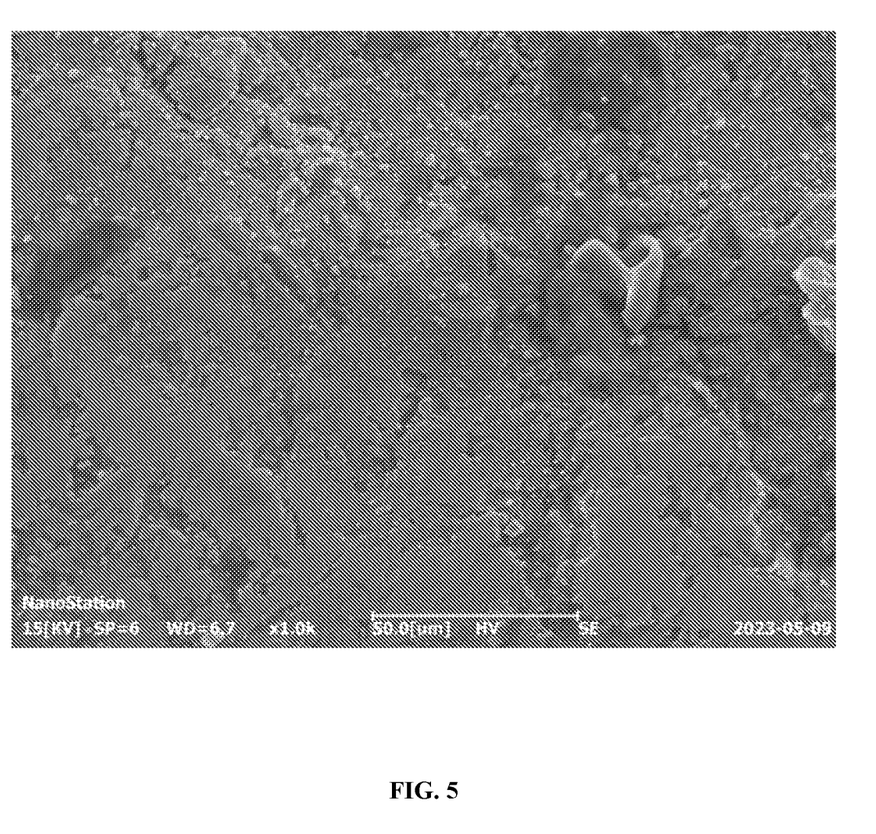
FIG. 5 is a surface morphology image of the non-stick metal vessel (1000× magnification) according to one embodiment of the present disclosure.
Figure 6:
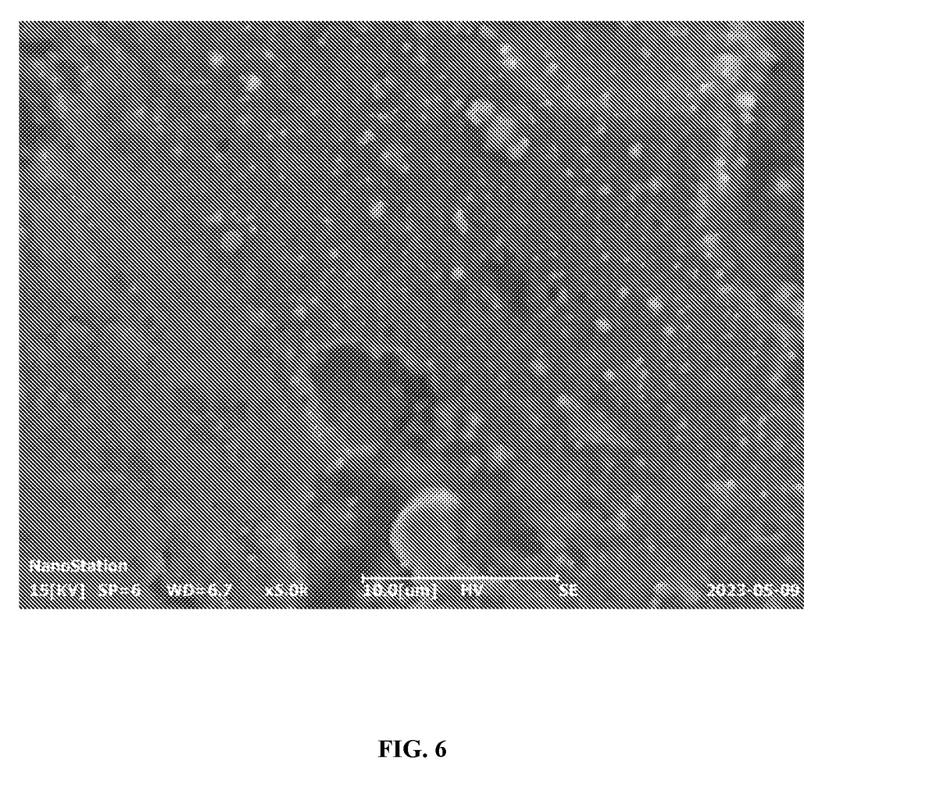
FIG. 6 is a surface morphology image of the non-stick metal vessel (5000× magnification) according to one embodiment of the present disclosure.

As shown in FIGS. 1-6, the non-stick metal vessel 100 includes a first metal layer 101 and a second metal layer 102. The first metal layer 101 is positioned as the inner layer and is constructed with a micro-textured surface consisting of micrometer-level pores. This micro-textured surface is formed through sandblasting treatment, preferably using a multi-stage sandblasting process. In other embodiments, embossing treatment can also be employed. The micro-textured surface is coated with a PVD multi-metal film 104, which contains micro-nano level pores to form a porous oil-locking structure. The first metal layer 101 and the second metal layer 102 are bonded together by a heat distribution layer 103, which has higher thermal conductivity than the first metal layer 101 to prevent localized overheating and damage to the PVD multi-metal film 104.

Physical Vapor Deposition (PVD) is a technique used to deposit thin films with specific functionalities onto a substrate surface through the physical transformation of material sources (solid or liquid) into gaseous atoms, molecules, or partially ionized species under vacuum conditions. It is a prominent surface treatment method and can be classified into three main categories: vacuum evaporation, sputtering, and ion plating. The main methods of PVD include vacuum evaporation, sputter deposition, arc plasma deposition, ion beam deposition, and molecular beam epitaxy. The corresponding equipment for PVD includes vacuum evaporation machines, sputtering machines, and ion plating machines. Depending on the application, PVD can be further categorized into tool coating and decorative coating.

In order to ensure the desired thickness of the PVD multi-metal film, the tool coating method is employed in this application. This allows the PVD multi-metal film to achieve a thickness range of 0.7 to 4.0 micrometers. Preferably, the thickness of the PVD multi-metal film is within the range of 1.0 to 2.5 micrometers. Specifically, the thickness of the PVD multi-metal film is 2.0 micrometers in this embodiment, but in another embodiment, it can be 3 or 4 micrometers. It is important to note that the thickness of the PVD multi-metal film should be compatible with the micro-textured surface. The thickness of the PVD film needs to be smaller than the Rz value of the micro-textured surface to allow the formation of a micro-nano porous oil-locking structure on the micro-textured surface without covering it. In this application, the micro-nano porous oil-locking structure is formed on the basis of the micro-textured surface.

Furthermore, it should be noted that the micro-nano porous oil-locking structure refers to the deposition of nitrogen compounds, carbides, and oxides of multi-metal (including chromium and aluminum, and possibly titanium, copper, and iron) through PVD coating technology on a micro-scale roughened surface, forming micro-nano scale pores. The pore size of the micro-nano pores ranges from 0.1 to 3.0 micrometers, and in this embodiment, it ranges from 0.1 to 1.0 micrometers. The specific dimensions of the micro-scale pores can be measured using the Axioplan 2imaging microscope (model) by Carl Zeiss company, while the dimensions of the nano-scale pores can be measured using the Nova 400NanoSEM scanning electron microscope (model) by FEI, a manufacturer based in the United States.

In a preferred embodiment, to further enhance the longevity of the PVD coating 104, the non-stick metal utensil adopts a steel-aluminum-steel composite structure. The first metal layer 101 is a stainless steel layer, the heat distribution layer 103 is an aluminum layer, and the second metal layer 102 is another stainless steel layer, such as SUS430. It is preferable to select food-grade stainless steel, particularly for the first metal layer 101, such as SUS304. The second metal layer 102 primarily serves a protective function. Besides stainless steel, the second metal layer can be made from metals, such as titanium alloy. To further improve the non-stick performance on the inner surface, multiple etched grooves arranged in an array pattern can be etched on the inner surface before undergoing sandblasting treatment. These grooves can be produced using chemical etching or laser etching techniques, or through methods like embossing or engraving, allowing the micro-roughened surface to be formed on the surface of the etched grooves. The array arrangement of the grooves can create a lotus leaf-like structure inside the non-stick metal vessel 100, thus enhancing the non-stick performance.

In this embodiment, the micro-nano pores have the ability to expand or contract with changes in heating temperature. When heating the non-stick utensil with animal or vegetable oil, the micro-nano pores expand as the temperature of the utensil rises and contract as the temperature decreases. It is further explained that when the user heats the utensil, the micro-nano pores expand, facilitating the entry and exit of oil. When the heating is stopped and the utensil gradually cools, the micro-nano pores contract, trapping the oil inside and achieving the oil-locking function, thereby maintaining the non-stick properties of the utensil surface. In this embodiment, the micro-nano pores with pore sizes or opening widths ranging from 0.1 to 1 µm exhibit excellent oil retention and locking capabilities, thus enhancing the non-stick performance of the utensil surface. The specific view of the micro-nano pores can be seen in FIG. 3. The micro-nano porous structure of the PVD multi-metal film in the present disclosure, after oil retention, can achieve a water contact angle of 95 degrees or higher, thereby providing excellent non-stick performance.

In this embodiment, the PVD multi-metal film includes titanium, chromium, and aluminum. The chromium content ranges from 20 to 50 atomic percent (at %), the aluminum content ranges from 50 to 70 at %, and the titanium content ranges from 1 to 10 at %. The presence of titanium in the range of 1 to 10 at % effectively reduces the surface energy, thereby improving the non-stick performance. Preferably, the titanium content is in the range of 3 to 6 at %, specifically 3 at %. The aluminum element in the PVD multi-metal film reduces the surface energy and enhances the non-stick performance, with an optimal aluminum content of around 30 at %. The inclusion of chromium not only reduces the surface energy but also improves corrosion resistance and prevents the precipitation of heavy metal. The preferred chromium content is 50 at %. The PVD multi-metal film includes a bottom layer, a middle layer, and a top layer deposited in sequence from bottom to top. The bottom layer contains titanium and/or chromium in metallic form, which improves the adhesion of the PVD multi-metal film to the roughened surface. It also prevents the leaching of heavy metal substances from the first metal layer, thus ensuring the safety of the utensil in contact with food. It should be noted that titanium and chromium can exist separately or simultaneously in the bottom layer, both achieving the purpose of non-stick and preventing heavy metal leaching. However, the performance is enhanced when both titanium and chromium are present.

In the middle layer, chromium aluminum nitride and/or carbide are present, and it may further include titanium nitride and/or carbide. Specifically, examples include titanium nitride (TiN), chromium nitride (CrN), aluminum nitride (AlN), titanium carbide (TiC), chromium carbide (CrC), aluminum carbide (AlC), aluminum titanium nitride (AlTiN), aluminum chromium nitride (AlCrN), aluminum titanium nitride (AlTiN), aluminum chromium nitride (AlCrN), and chromium aluminum carbide (Cr2AlC). The specific content of the multi-metal can be adjusted within the aforementioned range by those skilled in the art. It should be noted that chromium aluminum nitride and carbide can exist separately or simultaneously. In particular, chromium carbide significantly enhances the hardness, wear resistance, corrosion resistance, and hydrophobicity of the PVD multi-metal film. In another embodiment, the addition of chromium carbide to the top layer can further improve the hydrophobicity of the PVD multi-metal film. Among the nitrides, titanium nitride exhibits good thermal stability and excellent resistance to thermal shock, aluminum nitride is in a ceramic state and has excellent thermal conductivity, which prevents localized overheating and damage to the PVD film, and chromium nitride possesses good corrosion resistance and can reduce the friction coefficient of the PVD film, resulting in excellent wear resistance. Therefore, the combination of titanium, chromium, and aluminum nitrides and carbides provides higher hardness and wear resistance. Additionally, the middle layer enhances the PVD film's resistance to mechanical and thermal shocks, making it less prone to damage even when cooking with metal utensils or experiencing localized overheating. In this embodiment, the PVD multi-metal film has a low surface energy, high hardness, and excellent non-stick performance. Specifically, its hardness can reach HV1000 to 5000, surface energy can be below 40 dynes, and the water contact angle is above 95 degrees.

Specifically, in this embodiment, the middle layer comprises chromium nitride and aluminum nitride, with chromium nitride content ranging from 60 to 80 wt %, specifically 75 wt %, and aluminum nitride content ranging from 20 to 40 wt %, specifically 25 wt %. In another embodiment, the middle layer contains chromium carbide, with chromium carbide content ranging from 85 to 95 wt %, and the remaining components being a combination of aluminum nitride and titanium nitride, or a combination that also includes aluminum carbide. The top layer includes metal copper and aluminum oxide, with copper content ranging from 1.0 to 10 wt %, specifically 5 wt %. The top layer also includes iron oxide, with iron oxide content ranging from 3 to 15 wt %, specifically 10 wt %, or it can be 5 wt % or 12 wt %. The wt % represents the weight percentage. In the top layer, the content of other components and impurities, excluding metal copper, aluminum oxide, and iron oxide, is less than 5 wt %.

In this embodiment, the PVD film is a non-stick metal layer primarily including chromium and aluminum. The presence of aluminum in the PVD multicomponent metal film helps reduce its surface energy, thereby enhancing its non-stick properties. Chromium, besides reducing surface energy, also improves corrosion resistance and prevents the precipitation of heavy metals. In this embodiment, the main metallic components of the PVD multicomponent metal film include titanium, aluminum, chromium, iron, and copper, while non-metallic components mainly consist of oxygen, carbon, nitrogen, and silicon.

The top layer can also include oxides of titanium and chromium, specifically, at least one oxide that contains titanium and chromium, such as titanium oxide or a combination of titanium oxide and chromium oxide. The combination of metal copper and aluminum oxide (or copper-aluminum-iron oxide) in the top layer provides excellent non-stick properties. The top layer can form an oxide film on the surface of the PVD film, thereby preventing discoloration issues during later use. Additionally, aluminum oxide helps prevent the oxidation of copper, which can result in the formation of toxic copper oxide.

By incorporating metal copper into the PVD multi-metal film, it acquires antibacterial properties. Additionally, when the copper content is below 10 wt %, it further enhances the film's non-stick performance.

In this embodiment, the bottom layer adheres to the micro-roughened surface, while the top layer adheres to the surface of the middle layer. Both the top and bottom layers have a relatively small thickness, specifically ranging from 0.1 to 1 μm. In this embodiment, they are precisely 0.3 μm. In other embodiments, the thickness can be 0.5 μm or 0.8 μm. The middle layer has a thickness of 5 to 6.8 μm, specifically 6.4 μm.

The inner surface of the PVD multi-metal film 104 is polished, for example, through high-pressure water polishing or other methods. The thickness range of the PVD multi-metal film 104 is from 0.7 to 6.0 μm, with a preferred range of 2 to 5 μm. Specifically, the thickness of the PVD multi-metal film 104 is 2 μm.

Based on the aforementioned disclosure, skilled person in the art may adjust the proportions of various components according to their specific needs to create a low surface energy porous oil-locking structure. Additionally, other metal or non-metal components can be introduced in addition to the mentioned multi-metal composition. For example, the inclusion of silicon can form high-melting-point iron silicide. Through testing, the hardness of the PVD multi-metal film 104 ranges from HV1000 to HV5000, with a preferred range of HV1100 to HV3500, and an even more preferred range of HV2000 to HV3500. Moreover, the PVD multi-metal film exhibits low surface energy while demonstrating outstanding hardness and wear resistance. This provides the present disclosure with the beneficial effects of excellent anti-sticking properties, high hardness, good wear resistance, and long service life.

In this embodiment, the wear resistance of the PVD multi-metal film 104 is determined according to the Chinese national standard "GB/T32095.2-2015 Household Food Contact Metal Utensil—Part 2: Test Methods for Non-Stick Performance and Wear Resistance" by conducting a wear test for 5000 cycles. Subsequently, an oil-free fried egg test is performed, and the film achieves a Grade I non-stick rating. Grade I signifies that a plastic spatula can remove the egg without causing any damage or leaving any residue. Grade II indicates that a plastic spatula cannot remove the egg without causing damage, but residue can be easily wiped away with a damp sponge or cloth. The non-stick performance of the non-stick metal vessel 100 in this disclosure is rated as Grade I. Based on long-term laboratory testing results, the number of Grade I eggs achieved ranges from 7 to 9, with a record high of 20 Grade I eggs, significantly surpassing the requirement of 3 eggs as per the Chinese standard.

The present disclosure also provides a non-stick utensil 100 with a PVD multi-metal film 104, which can be used as a frying pan. Additionally, this non-stick utensil can be utilized as an inner pot for electric rice cookers, pressure cookers, and other cooking appliances. The top layer of the non-stick utensil is made of chromium carbide for enhanced performance.

The present disclosure offers several advantageous effects as follows.

The non-stick metal utensil 100 according to the present disclosure, including the PVD multi-element metal film 104 non-stick utensil 100, achieves an excellent non-stick effect by depositing the PVD multi-element metal film 104 on the rough surface of the inner metal layer and controlling its thickness. This process transforms the micron-level pores on the rough surface into nano-level pores, resulting in a superior non-stick performance on the inner metal surface. However, during usage, the bottom of the utensil is prone to localized overheating, which may damage the PVD multi-element metal film 104 and compromise its non-stick properties. To address this technical challenge, the present invention incorporates an aluminum heat distribution layer 103 between the two metal layers. The aluminum heat distribution layer 103 ensures more uniform heat distribution on the bottom of the utensil, thereby extending its non-stick lifespan.

In summary, the present disclosure of the non-stick metal utensil (non-stick utensil) 100 offers outstanding non-stick performance. Even after undergoing 5000 cycles of wear testing, it maintains a non-stick level equivalent to Grade I. Furthermore, the disclosure's design ensures uniform heating on the bottom of the utensil, which further prolongs its non-stick performance. Additionally, the materials used in this disclosure comply with food safety standards, as they are free from harmful heavy metal elements, ensuring safety and healthiness.

The above description represents specific embodiments of the present disclosure, but the scope of the disclosure is not limited to these embodiments. Any modifications or substitutions that would be readily apparent to those skilled in the art within the disclosed technical scope are considered to be within the scope of the disclosure's protection. Therefore, the protection scope of the disclosure should be determined based on the claims.

What is claimed is:

1. A non-stick metal vessel, comprising a body; wherein an inner surface of the body is a roughened surface;
    the roughened surface is coated with a PVD multi-metal film;
    the PVD multi-metal film comprises a bottom layer, a middle layer, and a top layer which are sequentially deposited;
    the bottom layer comprises metal titanium and/or metal chromium;
    the middle layer comprises chromium nitride and aluminum nitride; content of the chromium nitride is ranged from 60 wt % to 80 wt % and content of the aluminum nitride is ranged from 20 wt % to 40 wt %; or,
    the middle layer comprises chromium carbide; content of the chromium carbide is ranged from 85 wt % to 95 wt %;
    wherein the top layer comprises metal copper and aluminum oxide; content of the copper is ranged from 1.0 wt % to 10 wt %.

2. The non-stick metal vessel according to claim 1, wherein a thickness of the PVD multi-metal film is ranged from 0.7 μm to 4.0 μm.

3. The non-stick metal vessel according to claim 1, wherein a thickness of the top layer is ranged from 0.1 μm to 1.0 μm.

4. The non-stick metal vessel according to claim 1, a hardness of the PVD multi-metal film, is ranged from HV1100 to HV 3500.

5. The non-stick metal vessel according to claim 1, wherein a surface energy of the PVD multi-metal film is below 40 dyne/cm$^2$, with a post-oil storage hydrophobic angle exceeding 95°.

6. The non-stick metal vessel according to claim 1, wherein a plurality of grooves are arranged within the body; the roughened surface is formed on the plurality of grooves.

7. The non-stick metal vessel according to claim 1, wherein the body comprises, in order from inside to outside, a first metal layer, a heat distribution layer, and a second metal layer; the first metal layer and second metal layer are integrally bonded through the heat distribution layer to achieve uniform heating across the first metal layer.

8. The non-stick metal vessel according to claim 7, wherein the first metal layer is made of a first stainless steel layer; the heat distribution layer is an aluminum layer; and the second metal layer is a second stainless steel layer.

9. A non-stick cooking utensil having a PVD multi-metal film, wherein the non-stick cooking utensil comprises the non-stick metal vessel of claim 1.

* * * * *